(12) United States Patent
Roddis

(10) Patent No.: US 7,748,715 B2
(45) Date of Patent: Jul. 6, 2010

(54) BEARING SEAL

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 219 days.

(21) Appl. No.: 11/765,786

(22) Filed: Jun. 20, 2007

(65) Prior Publication Data

US 2007/0296157 A1 Dec. 27, 2007

(30) Foreign Application Priority Data

Jun. 21, 2006 (GB) .................................. 0612304.6

(51) Int. Cl.
*F01D 11/02* (2006.01)
(52) U.S. Cl. ........................ 277/347; 277/411; 277/412; 277/421

(58) Field of Classification Search ................. 277/347, 277/411–412, 421
See application file for complete search history.

(56) References Cited

U.S. PATENT DOCUMENTS

| | | | | |
|---|---|---|---|---|
| 2,352,336 | A * | 6/1944 | Martin et al. | 277/433 |
| 2,750,214 | A * | 6/1956 | Bermingham | 277/396 |
| 3,042,417 | A * | 7/1962 | Derman et al. | 277/425 |
| 4,863,177 | A * | 9/1989 | Rockwood et al. | 277/416 |
| 5,221,095 | A * | 6/1993 | Orlowski | 277/303 |
| 7,090,220 | B2 * | 8/2006 | Hoeting et al. | 277/347 |
| 7,484,734 | B2 * | 2/2009 | Anderberg | 277/433 |

* cited by examiner

*Primary Examiner*—Vishal Patel
(74) *Attorney, Agent, or Firm*—Edwin D. Schindler

(57) ABSTRACT

A bearing seal includes a radially split stator and a rotor. The rotor is enclosed within the stator along the internal length of the rotor. The rotor may, optionally, also be radially split.

4 Claims, 2 Drawing Sheets

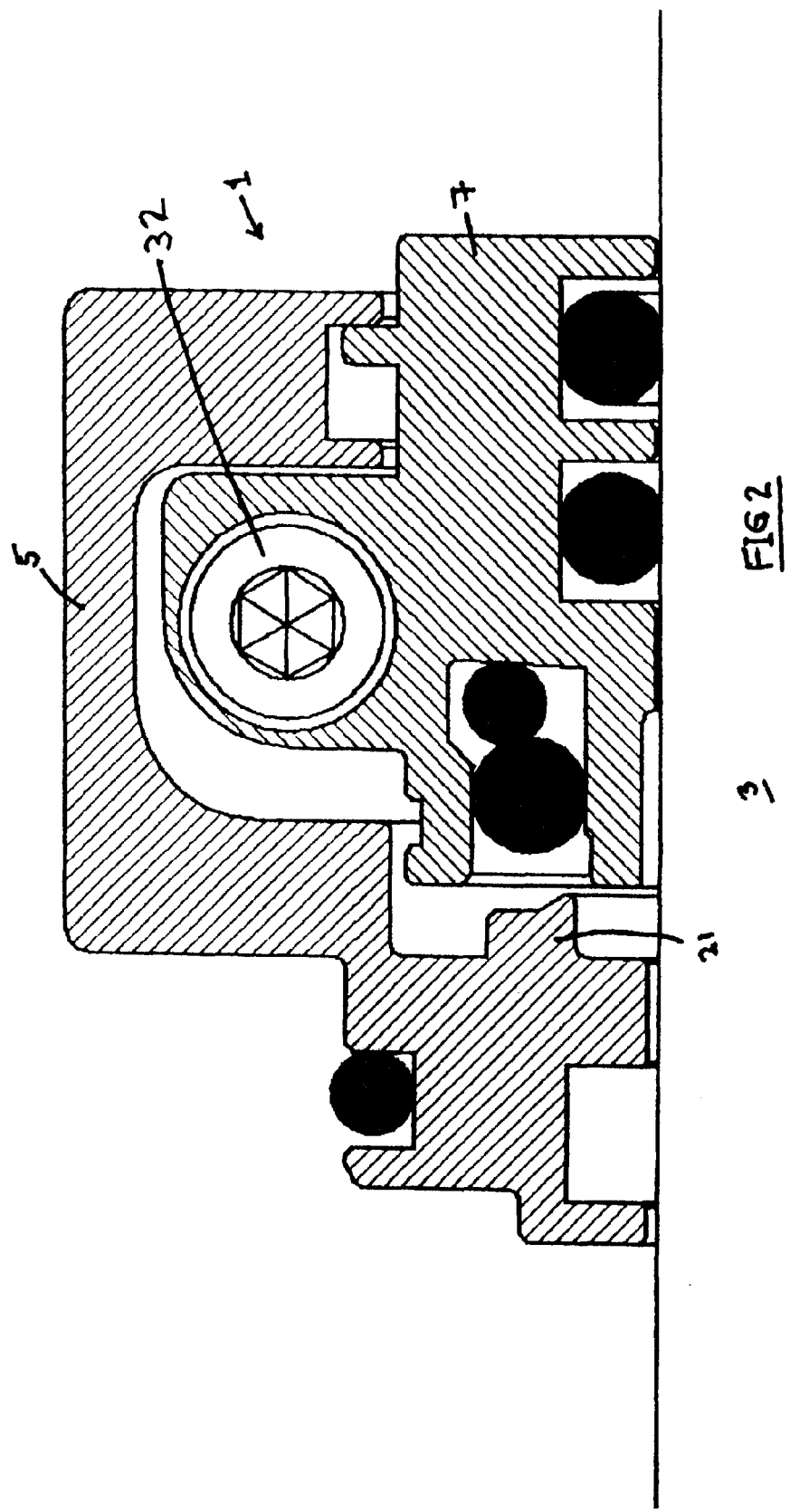

BEARING SEAL

BACKGROUND OF THE INVENTION

1. Technical Field of the Invention

Figure 1:
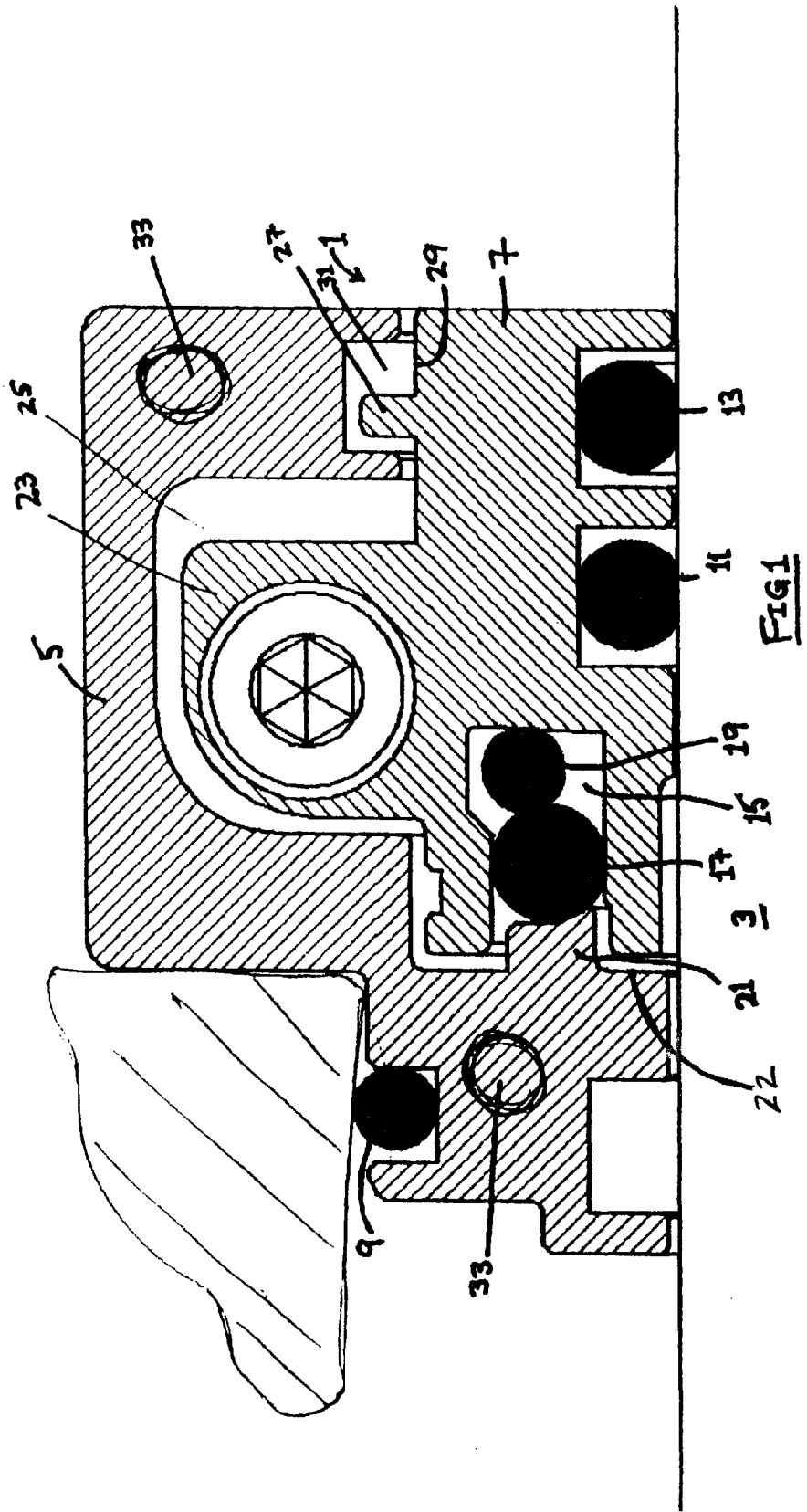

This invention relates to bearing protectors, especially, but not exclusively, of the non-contacting labyrinth seal type, and their use in rotating equipment, especially equipment which has a particularly large shaft or is difficult to disassemble/strip down.

2. Description of the Prior Art

An example of a piece of rotating equipment which is difficult to disassemble is a centrifugal pump with bearing assemblies supporting the rotating shaft.

In such equipment, each bearing arrangement typically consists of at least one bearing housed in a bearing chamber. The bearing is lubricated and sealed between the rotor to stator interface to prevent the ingress or egress of a fluid or solid to or from the bearing cavity, since such unwanted material results in the deterioration of equipment life.

Bearing protectors are often also referred to as bearing seals or bearing isolators. Such seals have applications beyond the protection of a bearing in rotating equipment. Accordingly, while reference will be made below to bearing protectors, it should be understood that this term is used, as far as this invention is concerned, in connection with such wider applications.

During pump operation, bearing seal components may deteriorate to such an extent that they must be repaired. Often, it is not economically feasible to take a pump out of production, disassemble it and remove the interference fitted bearings in order to fit new bearing seals. This therefore creates a dilemma for the pump operator, since the deteriorated seals will accelerate the probability that debris and moisture enter the bearings and cause major failure/cost.

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Non-contacting bearing protectors can be of repeller or labyrinth configuration. Reference is made to our co-pending labyrinth seal bearing protection application, United Kingdom Patent Application No. 0415548.7, which defines a substantially non-contacting bearing protector with a static shut-off device.

In a non-contacting bearing protector, the rotating component typically has a complex outer profile which is located adjacent and in close radial and longitudinal proximity to a complex inner profile of the stationary component. Together these complex profiles, in theory, provide a tortuous path preventing the passage of the unwanted materials or fluids.

Split seals are used in applications where the rotating equipment is difficult to disassemble. Such seals comprise two parts, a stator and a rotor, both of which are radially split about their central axis, so that they can be radially mounted over a shaft compared to the more traditional longitudinal mounting on the shaft of a conventional non-split seal design.

Conventional labyrinth seal technology indicates that the closely positioned longitudinal counter rotational members are substantially parallel to each other and run perpendicular to the centreline of the shaft. As labyrinth seals are non-contacting designs there is a natural leak path through the rotor to stator interface. A radially split labyrinth, thus, has further leak points, given the nature of the design. In order to reduce leakage potential, radial, substantially male elements of the rotor can protrude longitudinally and mesh into substantially female radial recesses of the stator, thereby creating a tortuous path for fluid to pass. Unfortunately, a radially split labyrinth seal has to have radial access so that the stator can be assembled over the rotor while, in situ, on the shaft. Intermeshing longitudinal protrusions between the rotor and stator render impractical radial assembly unless there is sufficient longitudinal space available in the equipment for this operation to be done in a longitudinally spaced position, i.e. with the rotor and stator separated. At least one longitudinal end of the stator and/or rotor assembly must be open and this creates a potential leak path for contaminants to enter.

SUMMARY OF THE INVENTION

According to the present invention, there is provided a bearing seal comprising a radially split stator and a rotor, said rotor being enclosed within the stator along the entire length of the rotor.

Preferably, a tortuous path is defined between the stator and the rotor.

Preferably, the rotor is also radially split.

Preferably, the seal includes a static shut-off device. More preferably, the static shut-off device includes an annular sealing member located in a recess in one of said stator and said rotor, said sealing member bearing against an integral ring of the other member which extends into said recess.

Preferably, the sealing member is moveable from a first position engaging said integral ring and a second position spaced from said integral ring.

Preferably, a further annular member is located in the recess; the member being radially expandable when the rotor is rotated to allow movement of the sealing member to said second position.

Preferably, the tortuous path extends past said sealing member, when it is in its second position, and around a radial, integral protuberance forming part of said rotor. More preferably, the separate components of the rotor are connectable together by fastening means extending through said protuberance.

Accordingly, the present invention provides, in one embodiment, a split, non-contacting labyrinth seal which can be radially assembled onto an item of rotating equipment, the rotor and/or stator having a longitudinal extending protrusion which engages in a corresponding recess in the other of the rotor and/or stator.

The stator longitudinally encloses the rotor so that both longitudinal ends of the rotor are, when the seal is assembled, shrouded by radially extending portions of the stator. This makes it possible to create a tortuous, intermeshing fluid flow prevention path which is created by radially extending portions of the stator and/or rotor engaging in radially extending recesses of the rotor and/or stator.

In one embodiment, the radially split assembly is installed as a cartridge, in which the rotor and stator are captured within one cartridge assembly. This allows the optimum axial relationship between the rotor and the stator to be maintained when the assembly is pushed into its final, in use position.

As indicated above, a preferred embodiment of the present invention incorporates a shut-off device which is a stator to rotor sealing arrangement and which prevents vapor and/or moisture entering into the bearing chamber when the equipment is idle, that is to say not in operation.

BRIEF DESCRIPTION OF THE DRAWING FIGURES

In the accompanying drawing, wherein similar reference numerals denote similar features throughout the several views:

FIG. 1 is a longitudinal section of one-half of a bearing seal of the invention; and, FIG. 2 is a similar longitudinal section of the bearing seal of FIG. 1, but with the components in their separated condition.

DETAILED DESCRIPTION OF THE DRAWING FIGURES AND PREFERRED EMBODIMENTS

The invention will now be further described, by way of example only, with reference to the accompanying drawings.

Referring to FIGS. 1 and 2 of the accompanying drawings, there is illustrated a bearing seal 1 mounted on a drive shaft 3 and comprising a stator 4, attached directly or indirectly to the bearing housing and a rotor 7 secured to drive shaft 3 for rotation therewith.

The seal 1 is in the form of a non-contacting labyrinth seal and, in the "in use" condition, shown in FIG. 1, the rotor 7 lies wholly within the stator 5.

The stator 5 is sealed to the bearing housing, or another part connected to the bearing housing, by means of a sealing ring and the rotor 7 is attached and sealed to shaft 3 by means of sealing rings 11 and 13.

Rotor 7 includes a recess 15 which extends longitudinally from one end of rotor 7 about a third of the way longitudinally into said rotor. Mounted within recess 15 is a first sealing ring 17 which is located adjacent to the mouth of recess 15 and, between sealing ring 17 and the blind end of recess 15, a second smaller diameter sealing member 19 which bears against the end wall of recess 15 and also against the larger sealing ring 17.

Sealing ring 17 also bears against a protuberance which extends from inner radial surface 22 into the mouth of recess 15. The end surface of protuberance 21 includes a radial portion and an inner inclined portion, at least the latter bearing against sealing ring 17 while the equipment is stationary. When the equipment is rotating, centrifugal force acting on ring 19 causes it to expand radially outwardly and allow sealing ring 17 to move longitudinally out of engagement with protuberance 21 of stator 5. This opens up a tortuous path which extends from the bearing cavity between the stator 5 and the drive shaft 3 and then all the way round the rotor and within the stator to the exterior (right hand side as seen in FIG. 1) of the bearing seal 1. This tortuous path is defined at least partly by a radially extending protuberance 23 which forms an integral part of rotor 7 and which extends into and is accommodated by a large recess 25 formed within stator 5. The tortuous flow extends further around a flange-like member 27 which extends radially outwardly from a circumferential surface 29 of rotor 7 and is accommodated within a relatively small recess 31 of stator 5.

Both the stator 5 and the rotor 7 are radially split into two halves. In order to assemble the seal while on the drive shaft 3, the two halves of the rotor 7 are first brought together round the drive shaft 3. They are fastened together by means of a nut and bolt arrangement 32 extending through the mating, or radially extending, protuberances 23 of the rotor 7. Then the two halves of the stator 5 are brought together around drive shaft 3 at a position, relative to rotor 7, as illustrated in FIG. 2. Accordingly, the protuberance 21 lies, in this position, outside the mouth of recess 15, thereby enabling the two halves of stator to be brought together. They interconnect by means of integral dowels in one or both halves engaging in corresponding recesses in the other half. Once this has been done, the seal may be pushed along the drive shaft until the stator 5 engages with the bearing housing as illustrated in FIG. 1. The rotor 7 is in turn pushed from the position shown in FIG. 2 to that shown in FIG. 1 so that the sealing ring 17 engages the protuberance 21.

The stator 5 may optionally be provided with location pegs and corresponding recesses, indicated at 33, which aid proper alignment of the stator halves during assembly. Alternatively or in addition, the stator may be provided with screw or bolt assemblies for fastening the two halves of the stator together.

While only several embodiments of the present invention have been shown and described, it will be obvious to those skilled in the art that many modifications may be made to the present invention without departing from the spirit and scope thereof.

What is claimed is:

1. A bearing seal, comprising: a radially split stator; and, a rotor enclosed within said radially split stator along an entire length of said rotor with both longitudinal ends of said rotor, when said bearing seal is assembled, being shrouded by radially extending portions of said radially split stator for capturing and retaining said rotor and said radially split stator within a single cartridge assembly, a tortuous path is defined between said radially split stator and said rotor, a stator shut-off device includes an annular sealing member and a further annular member located in a recess of one of said radially split stator and said rotor, and bearing against an integral ring on the other of said radially split stator and said rotor, said integral ring extending into said recess, said annular sealing member is movable from a first position engaging said integral ring to a second position spaced from said integral ring and the tortuous path extends across said shut-off device.

2. The bearing seal according to claim 1, wherein said rotor is radially split.

3. The beating seal according to claim 1, wherein said further annular member being radially expandable when the rotor is rotated for allowing movement of said annular sealing member to said second position.

4. The bearing seal according to claim 1, wherein said tortuous path is defined between said radially split stator and said rotor, said tortuous path extending passed said annual sealing member, when said annual sealing member is in said second position, and around a radial protuberance of said rotor.

* * * * *